United States Patent
Ohtsubo et al.

(10) Patent No.: US 12,344,129 B2
(45) Date of Patent: Jul. 1, 2025

(54) SEAT CONTROL SYSTEM AND METHOD FOR SETTING DRIVING POSTURE

(71) Applicant: MAZDA MOTOR CORPORATION, Hiroshima (JP)

(72) Inventors: Tomonori Ohtsubo, Hiroshima (JP); Hiroki Uemura, Hiroshima (JP); Yoshito Hirata, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 281 days.

(21) Appl. No.: 17/995,381

(22) PCT Filed: Feb. 15, 2021

(86) PCT No.: PCT/JP2021/005459
§ 371 (c)(1),
(2) Date: Oct. 3, 2022

(87) PCT Pub. No.: WO2021/199729
PCT Pub. Date: Oct. 7, 2021

(65) Prior Publication Data
US 2023/0166637 A1     Jun. 1, 2023

(30) Foreign Application Priority Data

Apr. 1, 2020     (JP) ................. 2020-066117

(51) Int. Cl.
*G05D 1/00*     (2024.01)
*B60N 2/00*     (2006.01)
*B60N 2/02*     (2006.01)

(52) U.S. Cl.
CPC ......... *B60N 2/0028* (2023.08); *B60N 2/0252* (2013.01); *B60N 2/0273* (2023.08);
(Continued)

(58) Field of Classification Search
CPC .................................................. B60N 2/0244
See application file for complete search history.

(56) References Cited

U.S. PATENT DOCUMENTS

| | | | | |
|---|---|---|---|---|
| 6,042,145 A | * | 3/2000 | Mitschelen | ........ B60N 2/02246 280/753 |
| 2012/0053794 A1 | * | 3/2012 | Alcazar | ................ B60N 2/0273 701/49 |

(Continued)

FOREIGN PATENT DOCUMENTS

| | | |
|---|---|---|
| JP | 2006-015872 A | 1/2006 |
| JP | 2009-143457 A | 7/2009 |

(Continued)

OTHER PUBLICATIONS

International Search Report issued in PCT/JP2021/005459; mailed Apr. 27, 2021.

(Continued)

*Primary Examiner* — Vivek D Koppikar
*Assistant Examiner* — Paul W Arellano
(74) *Attorney, Agent, or Firm* — Studebaker Brackett PLLC

(57) ABSTRACT

A seat control system for setting a driving posture and a seat control method is provided, in which body shape information indicating a body shape is input. Posture range information corresponding to the input body shape information is extracted from body shape posture range correspondence information, in which the body shape information and posture range information indicating a posture range of a vehicle seat corresponding to a driving posture range correspond to each other. A posture of the vehicle seat is controlled such that the posture of the vehicle seat falls within the posture range of the vehicle seat indicated by the extracted posture range information.

8 Claims, 7 Drawing Sheets

(52) U.S. Cl.
CPC .......... *B60N 2/0268* (2023.08); *B60N 2/0278* (2023.08); *B60N 2210/24* (2023.08)

(56) References Cited

U.S. PATENT DOCUMENTS

| | | | |
|---|---|---|---|
| 2016/0239175 A1 | 8/2016 | Suzuki et al. | |
| 2016/0368452 A1* | 12/2016 | Le | B60R 21/01552 |
| 2017/0217335 A1 | 8/2017 | Tominaga et al. | |
| 2018/0178678 A1* | 6/2018 | Ishikawa | G02B 27/0179 |

FOREIGN PATENT DOCUMENTS

| | | |
|---|---|---|
| JP | 2014-201174 A | 10/2014 |
| JP | 2017-136898 A | 8/2017 |
| WO | 2015/064417 A1 | 5/2015 |

OTHER PUBLICATIONS

Written Opinion of the International Searching Authority issued in PCT/JP2021/005459; mailed Apr. 27, 2021.

* cited by examiner

FIG. 4

| BODY SHAPE INFORMATION (HEIGHT [cm]) | POSTURE RANGE INFORMATION | | | |
|---|---|---|---|---|
| | RECLINING RANGE INFORMATION | SLIDE RANGE INFORMATION | LIFT RANGE INFORMATION | TILT RANGE INFORMATION |
| 150 | Rad TO Rau | Sad TO Sau | Fad TO Fau | Tad TO Tau |
| 151 | Rbd TO Rbu | Sbd TO Sbu | Fbd TO Fbu | Tbd TO Tbu |
| 152 | Rcd TO Rcu | Scd TO Scu | Fcd TO Fcu | Tcd TO Tcu |
| 153 | Rdd TO Rdu | Sdd TO Sdu | Fdd TO Fdu | Tdd TO Tdu |
| 154 | Red TO Reu | Sed TO Seu | Fed TO Feu | Ted TO Teu |
| ⋮ | ⋮ | ⋮ | ⋮ | ⋮ |

SEAT CONTROL SYSTEM AND METHOD FOR SETTING DRIVING POSTURE

TECHNICAL FIELD

The present disclosure relates to a seat control system for setting a driving posture and a seat control method for setting a driving posture that control a posture of a vehicle seat so as to achieve an appropriate driving posture (driving position).

BACKGROUND ART

In general, an appropriate driving posture (driving position) of an occupant is recommended for a secure, safe, and comfortable drive of a vehicle. This driving posture can be set (adjusted) by adjusting a tilt of a seat back, a position of a seat cushion in a front-rear direction, a position (height) of the seat cushion in an up-down direction, and a tilt of a seat surface of the seat cushion. When driving the vehicle, the occupant adjusts all or a part of these according to his/her own body shape, so as to adjust the driving posture. For example, Japanese Patent Document JP-A-2017-136898 is available in regard to this driving posture.

A vehicle seat control system disclosed in JP-A-2017-136898 is equipped with: seat drive means for adjusting a position posture of a seat; storage means for storing seat information on the position posture of the seat in a manual driving state; and control means for driving the seat drive means on the basis of the seat information that is read from the storage means. In such a vehicle seat control system, the seat information that is adjusted according to the occupant's body shape is stored in the storage means, so as to be able to achieve the position posture of the seat by using the seat information at the time when the occupant gets in the vehicle, and to eliminate need for manual adjustment by the occupant.

The appropriate driving posture is achieved by the following specified procedure. In the procedure, for example, the seat back is inclined without giving a sense of discomfort to an abdominal area, a heel is set at a position where an accelerator pedal and a brake pedal can easily be depressed, the position of the seat cushion in the front-rear direction is set to a natural position at which the sense of discomfort is not given to the legs, the position (height) of the seat cushion in the up-down direction is set such that the occupant can see about a quarter of a hood, and the like. However, because the occupant does not know the specified procedure, does not execute the specified procedure, or the like when adjusting the driving posture, for example, the driving posture may not be adjusted appropriately. In the case where the seat information of the occupant is not stored in the storage means of the vehicle seat control system disclosed in JP-A-2017-136898, the position posture of the seat cannot be replicated. As a result, the driving posture may not be adjusted to such an appropriate driving posture. Moreover, the position posture of the seat in the seat information that is stored in the storage means may not be the appropriate driving posture.

SUMMARY

The present disclosure has been made in view of the above-described circumstance and therefore has a purpose of providing a seat control system for setting a driving posture and a seat control method for setting a driving posture capable of automatically achieving an appropriate driving posture according to an occupant's body shape.

In a seat control system for setting a driving posture and a seat control method for setting a driving posture according to the present disclosure, body shape information indicating a body shape is input, posture range information corresponding to the input body shape information is extracted from body shape posture range correspondence information in which the body shape information and posture range information indicating a posture range of a vehicle seat corresponding to a driving posture range correspond to each other, and a posture of the vehicle seat is controlled such that the posture of the vehicle seat falls within the posture range of the vehicle seat indicated by the extracted posture range information.

In the seat control system for setting a driving posture and the seat control method for setting a driving posture according to the present disclosure, it is possible to automatically achieve an appropriate driving posture according to an occupant's body shape.

The above description as well as other features and advantages of the present disclosure will become apparent from the description of embodiments below and the accompanying drawings.

BRIEF DESCRIPTION OF THE DRAWINGS

FIG. 4 is view illustrating a body shape posture range correspondence information table that is stored in the seat control system for setting a driving posture.

DETAILED DESCRIPTION

Figure 1:
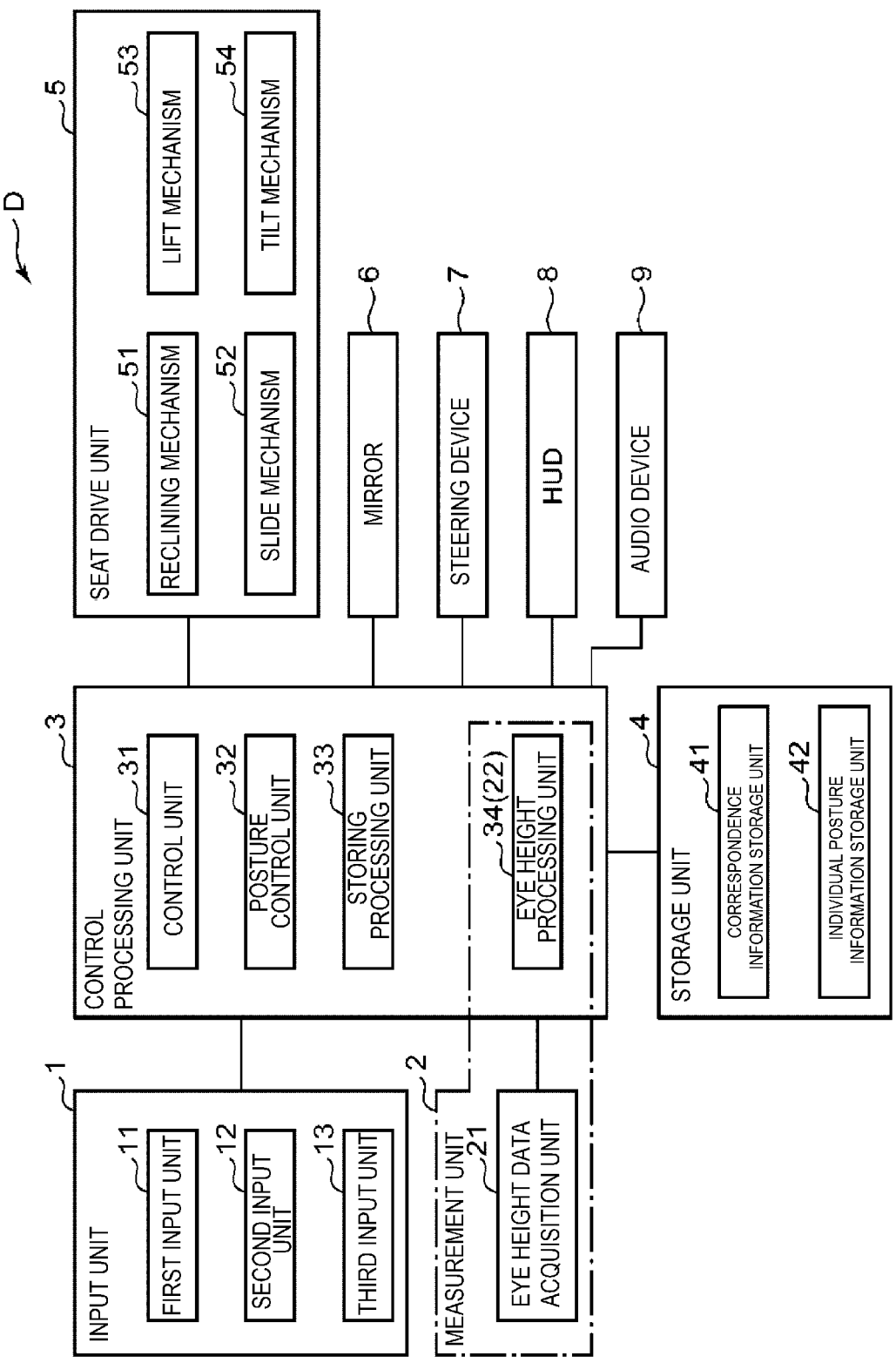
FIG. 1 is a block diagram illustrating a configuration of a seat control system for setting a driving posture according to an embodiment of the present disclosure.

A description will hereinafter be made of one or plural embodiments of the present disclosure with reference to the drawings. However, the scope of the disclosure is not limited to the disclosed embodiment(s). Components that are denoted by the same reference signs in the drawings are the same components, and a description thereon will appropriately be omitted. In the present specification, components will be denoted by the reference sign without suffixes when being collectively described, and will be denoted by the reference sign with the suffixes when being individually described.

A seat control system for setting a driving posture in the embodiment is a system for controlling a posture of a vehicle seat so as to achieve an appropriate driving posture (driving position). This seat control system for setting a driving posture includes the vehicle seat used in a vehicle; a correspondence information storage unit for storing body shape posture range correspondence information in which body shape information on a body shape and posture range information on a posture range of the vehicle seat corresponding to a driving posture range correspond to each other; a seat drive unit for moving a posture of the vehicle seat; an input unit for inputting the body shape information; and a posture control unit for extracting the posture range information, which corresponds to the body shape information input to the input unit, from the body shape posture range correspondence information stored in the correspondence information storage unit and controlling the seat drive unit such that the posture of the vehicle seat falls within the posture range of the vehicle seat indicated by the extracted posture range information. A further specific description will hereinafter be made of such a seat control system for setting a driving posture.

Figure 2:
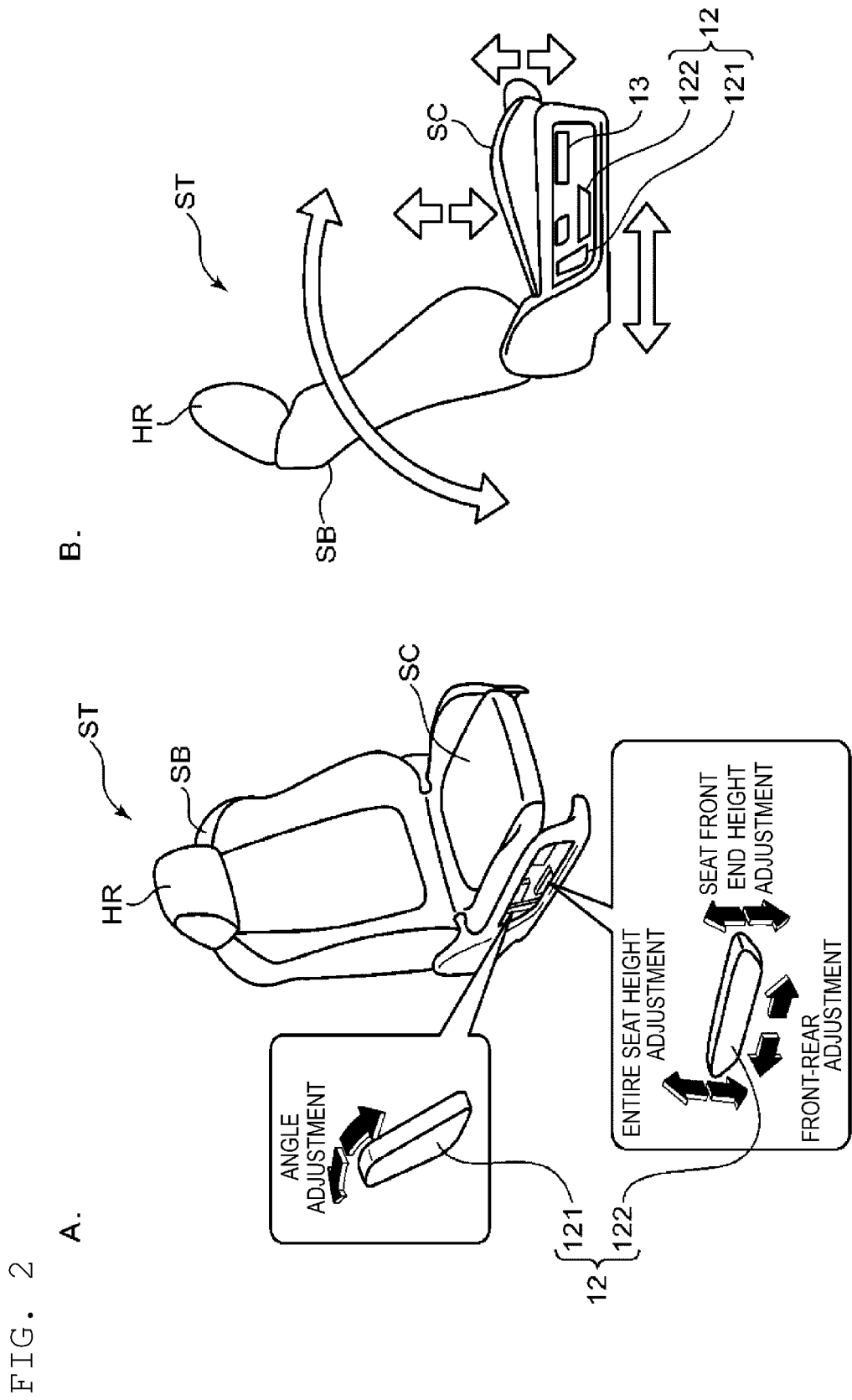
FIG. 2 includes views for explaining a second input unit of the seat control system for setting a driving posture.
Figure 3:
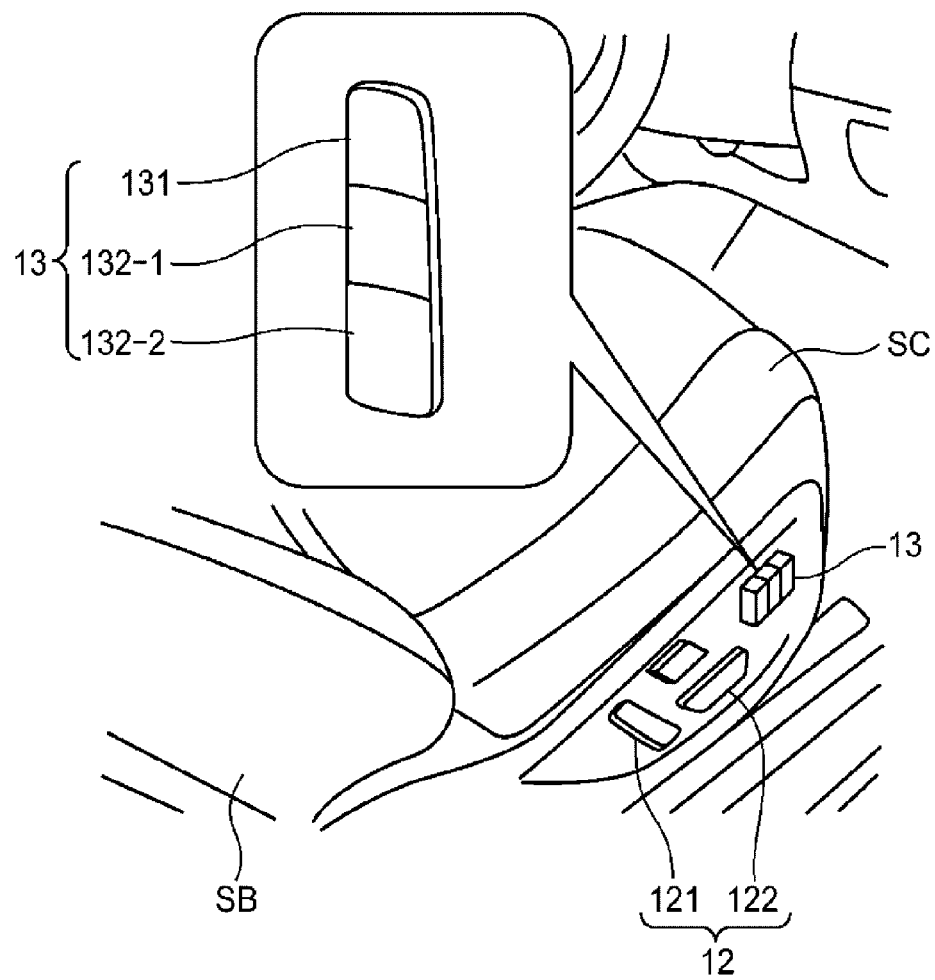
FIG. 3 is a view for explaining a third input unit of the seat control system for setting a driving posture.
Figure 5:
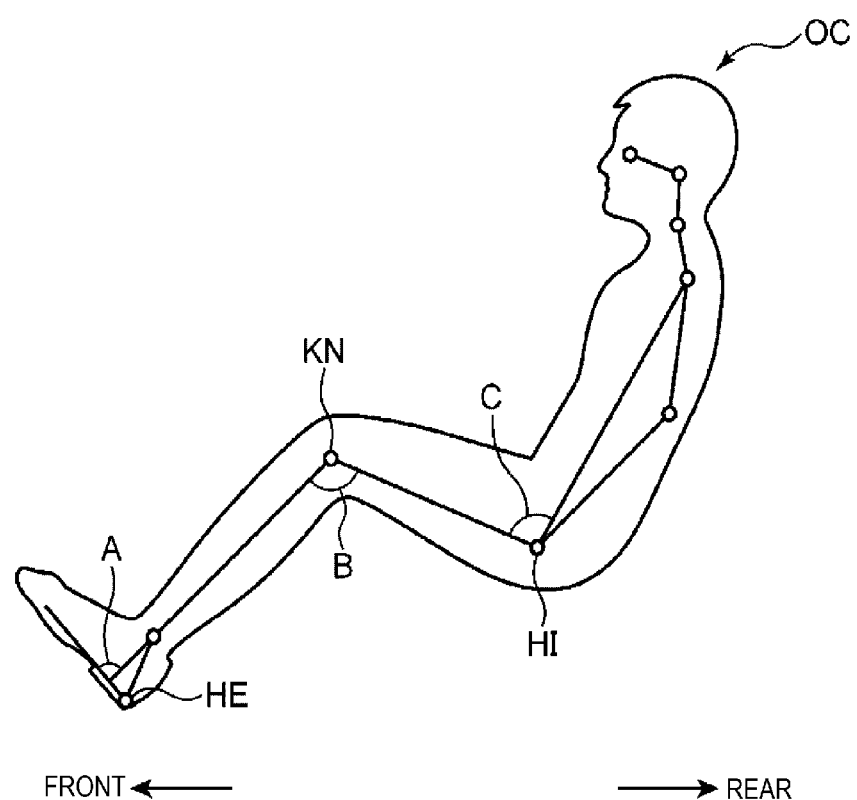
FIG. 5 is a view for explaining each joint angle in a driving posture of an occupant.
Figure 6:
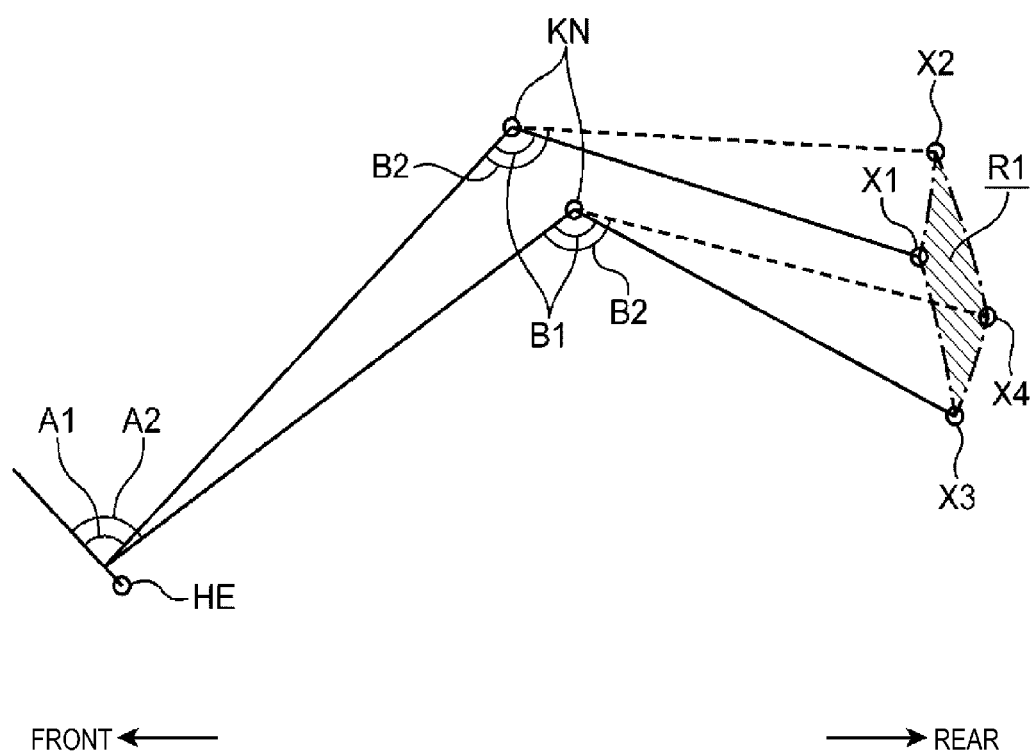
FIG. 6 is a view for explaining a hip point range that is seen in a vehicle width direction.

FIG. 1 is a block diagram illustrating a configuration of the seat control system for setting a driving posture according to the embodiment. FIG. 2 includes views for explaining a second input unit of the seat control system for setting a driving posture. FIG. 2A is a perspective view thereof, and FIG. 2B is a side view thereof. FIG. 3 is a view for explaining a third input unit of the seat control system for setting a driving posture. FIG. 4 is view illustrating a body shape posture range correspondence information table that is stored in the seat control system for setting a driving posture. FIG. 5 is a view for explaining each joint angle in a driving posture of an occupant. FIG. 6 is a view for explaining a hip point range that is seen in a vehicle width direction.

Here, in the following description, terms indicating directions such as "front", "rear", "right", "left", "up", and "down" each refer to a direction of the vehicle at the time when a forward travel direction of the vehicle is set as "front".

As illustrated in FIG. 1, a seat control system for setting a driving posture D in the embodiment includes an input unit 1, a measurement unit 2, a control processing unit 3, a storage unit 4, and a seat drive unit 5, for example. In the example illustrated in FIG. 1, the seat control system for setting a driving posture D further includes a mirror 6, a steering device 7, a head-up display (HUD) 8, and an audio device 9.

The seat drive unit 5 is a device that is connected to the control processing unit 3 and moves a posture of a vehicle seat ST according to control by the control processing unit 3. The vehicle seat ST is a device that is used in the vehicle and on which the occupant is seated, and, as illustrated in FIG. 2, includes: a seat cushion SC that forms a seat surface; a seat back SB, a lower end (one end) of which is attached to a rear end (another end) of the seat cushion SC, and which serves as a backrest; and a pillow-shaped headrest HR that is attached to an upper end (the other end) of the seat back SB, for example. The seat drive unit 5 is incorporated into the vehicle seat ST. In this embodiment, for example, the seat drive unit 5 includes: an electric reclining mechanism 51 that adjusts a tilt of the seat back SB; an electric slide mechanism 52 that adjusts a position (a front-rear position) of the seat cushion SC in a front-rear direction; an electric lift mechanism 53 that adjusts a position (up-down position or height) of the seat cushion SC in an up-down direction; and an electric tilt mechanism 54 that adjusts a tilt of the seat surface of the seat cushion SC by adjusting a height of a front end (one end) of the seat cushion SC in the up-down direction. Such electric reclining mechanism 51, slide mechanism 52, lift mechanism 53, and tilt mechanism 54 are each configured by known usual means and are disclosed in Japanese Patent Documents JP-A-2011-79472, JP-A-2019-172016, JP-A-2006-218882, and the like, for example. The tilt of the seat back SB is expressed by an angle that is defined by a horizontal plane (for example, a floor surface of the vehicle, or the like) normal to the up-down direction and an extending direction that extends in a substantial height direction of the seat back SB. The tilt of the seat surface is expressed by an angle that is defined by the horizontal plane and the seat surface.

The input unit 1 is a device that is connected to the control processing unit 3 and inputs, to the seat control system for setting a driving posture D, various instructions (various commands) such as an instruction to move the posture of the vehicle seat ST (an instruction to adjust the posture of the vehicle seat ST) and an instruction to store the posture of the vehicle seat ST that is adjusted (controlled) according to the occupant's body shape, for example, and various types of data that is required to operate the seat control system for setting a driving posture D and an example of which is the body shape information on the occupant's body shape, for example. The occupant's body shape is expressed by height, for example, and the body shape information in this embodiment is the height. As illustrated in FIG. 1 to FIG. 3, in this embodiment, the input unit 1 includes a first input unit 11, a second input unit 12, and a third input unit 13.

The first input unit 11 is a device that inputs the various types of the data such as the body shape information. The first input unit 11 may be configured to include plural switches such as a numeric keypad. However, in this embodiment, the first input unit 11 is a columnar dial switch that can rotate about an axis and can be pushed in an axial direction, and is arranged in a center console that separates a driver's seat from a front passenger's seat in a vehicle cabin, for example. In regard to this dial switch, with rotation of the dial switch, a numerical value that is displayed on the HUD 8 (or a center display (not illustrated)) is increased/reduced according to a rotational direction (for example, the numerical value is increased with clockwise rotation, and the numerical value is reduced with counterclockwise rotation), and then the numerical value that is displayed on the HUD 8 (or the center display) is confirmed by pushing the dial switch and is input to the seat control system for setting a driving posture D.

The second input unit 12 is a device that inputs the instruction to move the posture of the vehicle seat ST. For example, as illustrated in FIG. 2, in this embodiment, the second input unit 12 includes: a seat back switch (SB switch) 121 for inputting an instruction to adjust the tilt of the seat back SB; and a seat cushion switch (SC switch) 122 for inputting instructions to adjust the front-rear position, the up-down position, and the tilt of the seat surface of the seat cushion SC, and is disposed on a lateral surface in a lower portion of the vehicle seat ST such that the SB switch 121 and the SC switch 122 imitate a side view shape of the vehicle seat ST. The SB switch 121 is configured that a lower end portion thereof is tilted substantially in the front-rear direction about a rotation axis. The SC switch 122 is configured that each of a front end and a rear end thereof is tilted substantially in the up-down direction with a substantially central portion thereof being a rotation axis, and is further configured to move in the front-rear direction.

The third input unit 13 is a device that inputs the instruction to store the posture of the vehicle seat ST adjusted (controlled) according to the occupant's body shape. For example, as illustrated in FIG. 3, in this embodiment, the third input unit 13 includes: a SET switch 131 for executing storing processing to store the current posture of the vehicle seat ST in the storage unit 4; and plural selection switches 132, each of which is used to specify a storage area of the storage unit 4 for storing the posture of the vehicle seat ST, and is disposed on the lateral surface of the lower portion of the vehicle seat ST. In the example illustrated in FIG. 3, the selection switches 132 are two first and second selection switches 132-1, 132-2.

The measurement unit 2 is a device that measures an eye height of the occupant who is seated on the vehicle seat ST. The eye height is measured from a specified reference position such as a position of the floor surface of the vehicle, a position of the seat surface of the seat cushion SC, or a position of a hip point according to the posture of the vehicle seat ST. For example, in this embodiment, the measurement unit 2 includes an eye height data acquisition unit 21 and an eye height processing unit 34(22). The eye height data acquisition unit 21 is a device that is connected to the control processing unit 3 and acquires specified data for measuring the eye height of the occupant who is seated on the vehicle seat ST according to control by the control processing unit 3. In this embodiment, the eye height processing unit 34(22) is functionally configured by the control processing unit 3 by executing a control processing program, which will be described below, and calculates the eye height of the occupant by processing the specified data acquired by the eye height data acquisition unit 21.

For example, the eye height data acquisition unit 21 includes: a camera that produces an image of the occupant who is seated on the vehicle seat ST; and a distance meter that measures a distance to the occupant who is seated on the vehicle seat ST, and is arranged next to the center display (not illustrated), for example. The eye height processing unit 34(22) calculates the eye height of the occupant on the basis of the image of the occupant produced by the camera and the distance to the occupant measured by the distance meter. For example, the distance meter transmits an infrared light pulse, receives reflected light of the infrared light pulse reflected by the occupant, and measures the distance by so-called time of fligt (TOF) based on a period from transmission timing of the infrared light pulse to reception timing of the reflected light. The eye height processing unit 34 (22) calculates an pixel position of a white eye area by extracting the white eye area from a specified image area, which is defined in advance and in which the occupant's face is assumed to appear, in the image of the occupant, which is produced by the camera, by image processing such as a white filter, calculates an actual length of a subject appearing in one pixel from the distance to the occupant, which is measured by the distance meter, an optical characteristic (for example, image magnification or the like) of an imaging optical system of the camera, and the like, and then calculates the eye height of the occupant from an actual height of a lower end portion of the image produced by the camera, the pixel position of the white eye area, and the actual length of the subject appearing in the one pixel. Here, the actual height of the lower end portion of the image, which is produced by the camera, is calculated in advance from the optical characteristic of the imaging optical system in the camera, an imaging direction (an optical axis direction), and the like, and is stored in the storage unit 4. For example, the specified image area is calculated in advance by an arrangement position of the camera, an arrangement position of the vehicle seat ST, the optical characteristic of the imaging optical system in the camera, the imaging direction thereof, and the like, and is stored in the storage unit 4. Alternatively, for example, the eye height data acquisition unit 21 includes a so-called stereo camera instead of the camera and the distance meter. The stereo camera produces an image of the occupant who is seated on the vehicle seat ST and measures the distance to the occupant who is seated on the vehicle seat ST. Further alternatively, for example, the eye height data acquisition unit 21 includes: a mark in known size (dimensions); and a camera that produces an image of the occupant who is seated on the vehicle seat ST and the mark. The mark is provided at a position at which the mark can be imaged by the camera even when the occupant is seated on the vehicle seat ST, for example, on a side of the headrest HR, and the camera is arranged to image the occupant's face and the mark diagonally from the front. The eye height processing unit 34(22) calculates the pixel position of the white eye area and the number of pixels in which the mark appears by extracting the white eye area and the mark from the specified image area in the image of the occupant, which is produced by the camera, by the image processing, calculates the actual length of the subject appearing in one pixel from the number of the pixels in which the mark appears and the size of the mark, and calculates the eye height of the occupant from the actual height of the lower end portion of the image, which is produced by the camera, the pixel position of the white eye area, and the actual length of the subject appearing in the one pixel.

For example, the mirror 6 includes a right and left pair of door mirrors (or side mirrors or the like) that are connected to the control processing unit 3 and are configured to be able to electrically adjust (control) mirror surfaces according to control by the control processing unit 3. Such a mirror 6, which can electrically adjust an angle of the mirror surface, is constructed of known usual means and is disclosed in Japanese Patent Documents JP-A-2016-130130 and JP-A-2011-102066, for example.

The steering device 7 is a mechanism for steering a steering wheel and includes: a steering wheel; a steering shaft that is connected to the steering wheel; a steering angle sensor that detects a steering angle generated to the steering shaft by an operation of the steering wheel; and a steering angle drive mechanism that sets the steering wheel at the steering angle according to the steering angle detected by the steering angle sensor, and the steering shaft is connected to the control processing unit 3 and includes: a tilt mechanism that electrically raises or lowers the steering wheel according to control by the control processing unit 3; and a telescopic mechanism that is connected to the control processing unit 3 and electrically moves the steering wheel forward or rearward according to control by the control processing unit 3. Such electric tilt mechanism and telescopic mechanism are each constructed of known usual means and are disclosed in Japanese Patent Documents JP-A-2020-19327 and JP-A-2019-23050, for example.

The HUD 8 is a device that is arranged in a dashboard in front of the driver's seat, that is connected to the control processing unit 3, and that projects and displays specified information, such as the body shape information input to the first input unit 11, onto a transparent planar optical member such as a front windshield according to control by the control processing unit 3. The HUD 8 is constructed of known usual means and is disclosed in Japanese Patent Documents JP-A-2015-161965 and JP-A-2019-166886, for example.

The audio device 9 is an acoustic device that is connected to the control processing unit 3 and is controlled by the control processing unit 3. In this embodiment, the audio device 9 includes plural speakers and can cause the occupant (a listener) to hear sound as if the sound is produced at different locations (positions) by adjusting output timing, volume, and the like of each of the plural speakers. Such an audio device 9 allows the occupant to hear the sound from each sound source such that the sound is produced from an arrangement position of each of the sound sources, and examples of the sound are a musical composition played by the plural sound sources such as a drum, an electric guitar, and vocals, and a musical composition played by the plural sound sources that are different musical instruments as in an orchestra. Such an audio device 9 is constructed of known usual means and is disclosed in Japanese Patent Documents JP-A-2006-67218 and JP-A-2019-80188, for example. According to control by the control processing unit 3, the audio device 9 adjusts the each output timing, the each volume, and the like according to positions of the occupant's ears calculated from the eye height, can thereby cause the occupant to appropriately listen to the musical composition according to the occupant's body shape, and thus can provide the occupant with a sense of immersion and a sense of realism.

The storage unit 4 is a circuit that is connected to the control processing unit 3 and stores various specified programs and the various types of the specified data according to control by the control processing unit 3. The various specified programs include the control processing programs, for example, and examples of the control processing programs are: a control program for controlling each of the units 1, 2, 4 to 9 in the seat control system for setting a driving posture D according to the function of the respective unit; a posture control program for extracting the posture range information, which corresponds to the body shape information input to the first input unit 11 and will be described below, from the body shape posture range correspondence information stored in a correspondence information storage unit 41, which will be described below, and controlling the seat drive unit 5 such that the posture of the vehicle seat ST falls within a posture range of the vehicle seat ST indicated by the extracted posture range information; a storing processing program for reading and writing the specified information from and in the storage unit 4 according to the operation of the input unit 1; and a height position processing program for calculating the eye height of the occupant by processing the specified data acquired by the eye height data acquisition unit 21. The various types of the specified data are data required to execute each of the programs, and include the body shape posture range correspondence information, seat posture information on the posture of the vehicle seat ST, and the like. For example, such a storage unit 4 includes read only memory (ROM) as a non-volatile storage element, electrically erasable programmable read only memory (EEPROM), and the like. The storage unit 4 include random access memory (RAM), and the like, and the RAM serves as so-called working memory for the control processing unit 3 and stores data and the like that are generated during execution of the specified program. The storage unit 4 functionally includes the correspondence information storage unit 41 and an individual posture information storage unit 42.

The correspondence information storage unit 41 stores the body shape posture range correspondence information in which the body shape information and the posture range information correspond to each other. The posture range information is information on the posture range of the vehicle seat ST corresponding to the driving posture range. In this embodiment, the posture range of the vehicle seat ST is a position range of the hip point, and the position range of the hip point is set on the basis of an ankle angle and a knee angle of the occupant who is seated on the vehicle seat ST.

Such a position range of the hip point to achieve the appropriate driving posture is disclosed in Japanese Patent Document JP-A-2019-38320, for example.

In order to achieve the appropriate driving posture, there is an appropriate range for each of an ankle angle A, a knee angle B, and a hip angle C of an occupant OC who is seen in the vehicle width direction. For example, in a state where a foot is simply placed on an accelerator pedal and does not depress the accelerator pedal (a state where an accelerator operation amount is zero), an appropriate range of the ankle angle A is equal to or larger than 90° and equal to or smaller than 100°. For example, an appropriate range of the knee angle B is equal to or larger than 119° and equal to or smaller than 132°. For example, an appropriate range of the hip angle C is equal to or larger than 90° and equal to or smaller than 110°. The appropriate driving posture is achieved within the driving posture range represented by each of these ranges.

In the case where the tilt of the seat surface is fixed, as illustrated in FIG. 5, the ankle angle A and the knee angle B of the occupant OC are defined on the basis of a heel point HE, a knee point KN, and a hip point HI. The heel point HE is defined at one point according to the body shape of the occupant OC and a position of the accelerator pedal. Since the accelerator pedal is fixed at a specified position according to the vehicle (a vehicle model) in which the seat control system for setting a driving posture D is used, the heel point HE is defined at one point according to the body shape of the occupant OC only. The hip point HI is defined according to the body shape of the occupant OC and the position of the seat cushion SC. The knee point KN is defined according to the heel point HE and the hip point HI. Accordingly, once the body shape of the occupant OC is defined, the seat cushion SC is positioned by the slide mechanism 52 and the lift mechanism 53, all of the heel point HE, the knee point KN, and the hip point HI are defined, and the ankle angle A and the knee angle B are thereby defined.

As illustrated in FIG. 5, in the case where the tilt of the seat surface is fixed, the hip angle C is defined according to a tilt of an upper body of the occupant OC. Accordingly, the hip angle C is defined when the seat cushion SC is positioned by using the slide mechanism 52 and the lift mechanism 53, and the tilt of the seat back SB is decided by using the reclining mechanism 51.

In this embodiment, the body shape of the occupant OC is expressed by the height as described above, and a length (a seated height) of the body from the hip point HI to a head side and a length (a leg length) from the hip point HI to a leg side in the body are determined by proportionally dividing the height by a specified ratio. For example, the specified ratio is calculated in advance from a standard body shape of inhabitants in a destination place of the vehicle in which the seat control system for setting a driving posture D is used.

From what have been described above, in the case where the tilt of the seat surface is fixed, a position range R1 of the hip point HI for achieving the appropriate driving posture is a range in a case where each of the ankle angle A and the knee angle B falls within the appropriate range. Here, the appropriate range of the ankle angle A is set to be equal to or larger than a first ankle angle A1 and equal to or smaller than a second ankle angle A2 (in the above-described example, equal to or larger than 900 and equal to or smaller than 100°), and the appropriate range of the knee angle B is set to be equal to or larger than a first knee angle B1 and equal to or smaller than a second knee angle B2 (in the above-described example, equal to or larger than 119° and equal to or smaller than 132°). As illustrated in FIG. 6, in the case where the ankle angle A is the first ankle angle A1 and the knee angle B is the first knee angle B1, the hip point HI is set at a first point X1. In the case where the ankle angle A is the first ankle angle A1 and the knee angle B is the second knee angle B2, the hip point HI is set at a second point X2. In the case where the ankle angle A is the second ankle angle A2 and the knee angle B is the first knee angle B1, the hip point HI is set at a third point X3. In the case where the ankle angle A is the second ankle angle A2 and the knee angle B is the second knee angle B2, the hip point HI is set at a fourth point X4. In the case where the heel point HE is fixed at one point, where the ankle angle A falls within the appropriate range where the ankle angle A is equal to or larger than the first ankle angle A1 and equal to or smaller than the second ankle angle A2, and where the knee angle B falls within the appropriate range where the knee angle B is equal to or larger than the first knee angle B1 and equal to or smaller than the second knee angle B2, as illustrated in FIG. 6, the hip point HI is present within the range R1 that is surrounded by the first point X1, the second point X2, the third point X3, and the fourth point X4. Thus, this range R1 is the position range R1 of the hip point HI to achieve the appropriate driving posture.

In an outline of the position range R1 of the hip point HI to achieve the appropriate driving posture, strictly speaking, a line that connects the first point X1 and the second point X2 and a line that connects the third point X3 and the fourth point X4 are circular arcs centered at the knee point KN, and a line that connects the first point X1 and the third point X3 and a line that connects the second point X2 and the fourth point X4 are circular arcs centered at a rotation axis on a lower side of a lower leg (near the heel point HE). Here, being within a linear approximation range, a range that is surrounded by the line connecting the first point X1 and the second point X2, the line connecting the second point X2 and the fourth point X4, the line connecting the fourth point X4 and the third point X3, and the line connecting the third point X3 and the first point X1 is set as the position range R1 of the hip point HI to achieve the appropriate driving posture.

Such a position range R1 of the hip point HI to achieve the appropriate driving posture is changed when the tilt of the seat surface is changed. Accordingly, within a changeable tilt range of the seat surface, the plural position ranges R1 of the hip point HI are set for plural tilts at specified angular intervals.

However, the position range R1 of the hip point HI to achieve the appropriate driving posture may be expanded or narrowed according to the vehicle model, the body shape, or the like, and can be one point or can be nonexistent.

The posture range information that indicates such a position range R1 of the hip point HI as the posture range of the vehicle seat ST corresponds to the height as body type information, and is stored in advance as the body shape posture range correspondence information in the correspondence information storage unit 41. More specifically, the posture range information may be expressed as coordinates indicating the position range R1 of the hip point HI in a coordinate system set for the vehicle seat ST. However, in this embodiment, the posture range information is expressed as a range of a drive amount of the reclining mechanism 51 (a movable range of the tilt, a reclining range), a range of a drive amount of the slide mechanism 52 (a movable range of the front-rear position, a slide range), a range of a drive amount of the lift mechanism 53 (a movable range of the up-down position, a lift range), and a range of a drive amount of the tilt mechanism 54 (a tiltable range, a tilt range), each of which falls within the position range R1 of the hip point HI. The drive amount of each of the reclining mechanism 51, the slide mechanism 52, the lift mechanism 53, and the tilt mechanism 54 is expressed with one boundary value (an upper limit value or a lower limit value) of the respective movable range being a reference. In this embodiment, the body shape posture range correspondence information is stored in a table form in the correspondence information storage unit 41.

For example, as illustrated in FIG. 4, a body shape posture range correspondence information table 411, in which this body shape posture range correspondence information is registered, includes: a body shape information field 4111 in which the body shape information is registered; and a posture range information field 4112 in which the posture range information that corresponds to the body shape information registered in the body shape information field 4111 is registered, and has a record per body shape information. In this embodiment, the height is registered in the body shape information field 4111, and the reclining range, the slide range, the lift range, and the tilt range are registered in the posture range information field 4112. Accordingly, the posture range information field 4112 includes: a reclining range information subfield 41121 in which the reclining range of the reclining mechanism 51 is registered; a slide range information subfield 41122 in which the slide range of the slide mechanism 52 is registered; a lift range information subfield 41123 in which the lift range of the lift mechanism 53 is registered; and a tilt range information subfield 41124 in which the tilt range of the tilt mechanism 54 is registered.

The individual posture information storage unit 42 stores the seat posture information that indicates the posture of the vehicle seat ST. In this embodiment, in order to store two pieces of the seat posture information in a manner to correspond to the two first and second selection switches 132-1, 132-2 provided to the third input unit 13, the individual posture information storage unit 42 includes: a first storage area for storing the seat posture information when the first selection switch 132-1 is operated; and a second storage area for storing the seat posture information when the second selection switch 132-1 is operated. The seat posture information may be expressed by a tilt angle of the seat back SB, as well as the front-rear position, the up-down position (the height), and a tilt angle of the seat surface of the seat cushion SC. However, in this embodiment, from a similar perspective to the posture range information, the seat posture information is expressed by the drive amount of the reclining mechanism 51, the drive amount of the slide mechanism 52, the drive amount of the lift mechanism 53, and the drive amount of the tilt mechanism 54.

The control processing unit 3 is a circuit that controls each of the units 1, 2, 4 to 9 in the seat control system for setting a driving posture D according to the function of the respective unit and that controls the posture of the vehicle seat ST so as to achieve the appropriate driving posture. For example, the control processing unit 3 is configured to include a central processing unit (CPU) and a peripheral circuit thereof. The control processing unit 3 is functionally configured by a control unit 31, a posture control unit 32, a storing processing unit 33, and the eye height processing unit 34(22) by executing the control processing program.

The control unit 31 controls each of the units 1, 2, 4 to 9 in the seat control system for setting a driving posture D according to the function of the respective unit and governs the control of the entire seat control system for setting a driving posture D.

As described above, the eye height processing unit 34(22) calculates the eye height of the occupant by processing the specified data that is acquired by the eye height data acquisition unit 21.

The posture control unit 32 controls the seat drive unit 5 to move the posture of the vehicle seat ST and adjust (control) the posture of the vehicle seat ST.

In automatic adjustment of the posture of the vehicle seat ST, the posture control unit 32 extracts the posture range information, which corresponds to the body shape information input to the first input unit 11, from the body shape posture range correspondence information table 411 stored in the correspondence information storage unit 41, and controls the seat drive unit 5 such that the posture of the vehicle seat ST falls within the posture range of the vehicle seat ST indicated by this extracted posture range information. Then, in this embodiment, the posture control unit 32 determines the specific posture of the vehicle seat ST within the posture range of the vehicle seat ST on the basis of the eye height, which is measured by the measurement unit 2, and controls the seat drive unit 5 such that the posture of the vehicle seat ST becomes this determined posture of the vehicle seat ST. In the case where an instruction to manually adjust the posture of the vehicle seat ST is input to the second input unit 12, the posture control unit 32 controls the seat drive unit 5 such that the posture of the vehicle seat ST becomes the posture of the vehicle seat ST corresponding to the instruction within the posture range of the vehicle seat ST indicated by the extracted posture range information.

As illustrated in FIG. 2A, in manual adjustment of the posture of the vehicle seat ST, in the case where the SB switch 121 is tilted forward, the posture control unit 32 controls the reclining mechanism 51 to tilt the seat back SB forward and gradually reduce the tilt of the seat back SB while the SB switch 121 is tilted and positioned forward. Then, when the SB switch 121 is resumed (returned to the original neutral position), the posture control unit 32 stops the reclining mechanism 51. The seat back SB maintains such a tilted posture. Meanwhile, in the case where the SB switch 121 is tilted rearward, the posture control unit 32 controls the reclining mechanism 51 to tilt the seat back SB rearward and gradually increase the tilt of the seat back SB while the SB switch 121 is tilted and positioned rearward. Then, when the SB switch 121 is resumed, the posture control unit 32 stops the reclining mechanism 51. The seat back SB maintains such a tilted posture. As illustrated in FIG. 2A, in the case where the SC switch 122 is moved forward, the posture control unit 32 controls the slide mechanism 52 to gradually move the seat cushion SC forward while the SC switch 122 is positioned forward. When the SC switch 122 is resumed (returned to the original neutral position), the posture control unit 32 stops the slide mechanism 52. The seat cushion SC maintains the posture thereof at the front-rear position. Meanwhile, in the case where the SC switch 122 is moved rearward, the posture control unit 32 controls the slide mechanism 52 to gradually move the seat cushion SC rearward while the SC switch 122 is positioned rearward. When the SC switch 122 is resumed, the posture control unit 32 stops the slide mechanism 52. The seat cushion SC maintains the posture thereof at the front-rear position. As illustrated in FIG. 2A, in the case where the rear end of the SC switch 122 is tilted upward, the posture control unit 32 controls the lift mechanism 53 to gradually raise the seat cushion SC while the SC switch 122 is tilted and positioned upward. Then, when the SC switch 122 is resumed (returned to the original neutral position), the posture control unit 32 stops the lift mechanism 53. The seat cushion SC maintains the posture thereof at the up-down position (the height). Meanwhile, in the case where the rear end of the SC switch 122 is tilted downward, the posture control unit 32 controls the lift mechanism 53 to gradually lower the seat cushion SC while the SC switch 122 is tilted and positioned downward. Then, when the SC switch 122 is resumed, the posture control unit 32 stops the lift mechanism 53. The seat cushion SC maintains the posture thereof at the up-down position. As illustrated in FIG. 2A, in the case where the front end of the SC switch 122 is tilted upward, the posture control unit 32 controls the tilt mechanism 54 to gradually raise the front end of the seat cushion SC while the SC switch 122 is tilted and positioned upward. Then, when the SC switch 122 is resumed (returned to the original neutral position), the posture control unit 32 stops the tilt mechanism 54. The seat cushion SC maintains the posture thereof at the tilt of the seat surface. Meanwhile, in the case where the front end of the SC switch 122 is tilted downward, the posture control unit 32 controls the tilt mechanism 54 to gradually lower the front end of the seat cushion SC while the SC switch 122 is tilted and positioned downward. Then, when the SC switch 122 is resumed, the posture control unit 32 stops the tilt mechanism 54. The seat cushion SC maintains the posture thereof at the tilt of the seat surface.

Here, in normal manual adjustment, by the operations of the SB switch 121 and the SC switch 122, the posture of the vehicle seat ST can be adjusted for the entire movable ranges of the reclining mechanism 51, the slide mechanism 52, the lift mechanism 53, and the tilt mechanism 54. Meanwhile, in the manual adjustment after the above-described automatic adjustment, as described above, by the operations of the SB switch 121 and the SC switch 122, the posture of the vehicle seat ST can be adjusted within the posture range of the vehicle seat ST that is indicated by the extracted posture range information (that is, the posture of the vehicle seat ST cannot be adjusted beyond the lower limit value and the upper limit value of the posture range, and the posture of the vehicle seat ST is limited by the lower limit value and the upper limit value of the posture range).

The storing processing unit 33 reads and writes the specified information from and in the storage unit 4 according to the operation of the input unit 1. More specifically, the storing processing unit 33 stores the current posture of the vehicle seat ST in the individual posture information storage unit 42 of the storage unit 4 according to the operation of the third input unit 13. When the first selection switch 132-1 is operated, the storing processing unit 33 accepts (prepares) the first storage area of the individual posture information storage unit 42 as the storage area for storing the posture of the vehicle seat ST. Then, when the SET switch 131 is operated, the storing processing unit 33 stores the seat posture information on the current posture of the vehicle seat ST in the first storage area of the individual posture information storage unit 42. When the second selection switch 132-2 is operated, the storing processing unit 33 accepts the second storage area of the individual posture information storage unit 42 as the storage area for storing the posture of the vehicle seat ST. Then, when the SET switch 131 is operated, the storing processing unit 33 stores the seat posture information on the current posture of the vehicle seat ST in the second storage area of the individual posture information storage unit 42.

In this embodiment, each of the first and second selection switches 132-1, 132-2 also functions as a switch that reads the seat posture information that is stored in the individual posture information storage unit 42 and moves the posture of the vehicle seat ST. In this case, the operations of the first and second selection switches 132-1, 132-2 at the time of reading are different from the above-described operations of the first and second selection switches 132-1, 132-2 at the time of storing. For example, the above-described operation of each of the first and second selection switches 132-1, 132-2 at the time of storing is a single push operation, and the operation of each of the first and second selection switches 132-1, 132-2 at the time of reading is a consecutive two-push operation. When the first selection switch 132-1 is pushed twice consecutively, the storing processing unit 33 reads the seat posture information, which is stored in the first storage area of the individual posture information storage unit 42, and the posture control unit 32 controls the seat drive unit 5 such that the posture of the vehicle seat ST becomes the posture of the vehicle seat ST indicated by this read seat posture information. Similarly, when the second selection switch 132-2 is pushed twice consecutively, the storing processing unit 33 reads the seat posture information, which is stored in the second storage area of the individual posture information storage unit 42, and the posture control unit 32 controls the seat drive unit 5 such that the posture of the vehicle seat ST becomes the posture of the vehicle seat ST indicated by this read seat posture information. In the above description, each of the first and second selection switches 132-1, 132-2 is used for a dual purpose. However, a dedicated switch may additionally be provided to read the seat posture information, which is stored in the individual posture information storage unit 42, and move the posture of the vehicle seat ST.

Figure 7:
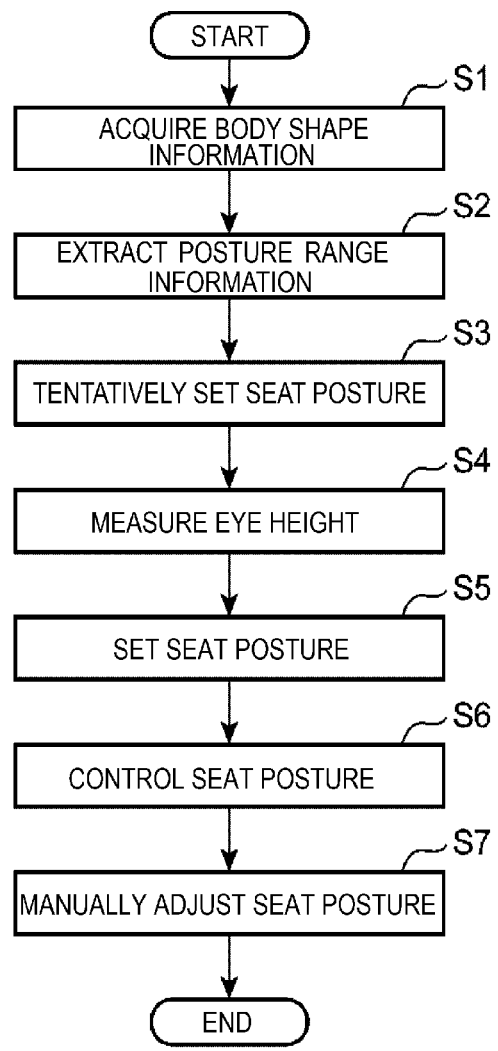
FIG. 7 is a flowchart illustrating operation of the seat control system for setting a driving posture related to posture control for a vehicle seat.

Next, a description will be made on the operation in this embodiment. FIG. 7 is a flowchart illustrating the operation of the seat control system for setting a driving posture related to the posture control for the vehicle seat.

When the vehicle starts operating, such a seat control system for setting a driving posture D initializes the necessary units and starts the operation thereof. The control processing unit 3 is functionally configured by the control unit 31, the posture control unit 32, the storing processing unit 33, and the eye height processing unit 34(22) by executing the control processing program. Then, for example, in response to operations of switches (not illustrated) to input an instruction to start the operation of the vehicle and to start the automatic adjustment of the driving posture, and the like, the following operation related to the posture control of the vehicle seat is started. The occupant is seated on the vehicle seat ST and inputs his/her own height as the body shape information from the first input unit 11 of the input unit 1.

In FIG. 7, in the seat control system for setting a driving posture D, the control processing unit 3 acquires the height as the body shape information that is input to the first input unit 11 (S1).

Next, in the seat control system for setting a driving posture D, the posture control unit 32 of the control processing unit 3 extracts the posture range information, which corresponds to the body shape information input to the first input unit 11, from the body shape posture range correspondence information stored in the correspondence information storage unit 41 (S2). More specifically, in this embodiment, the posture control unit 32 refers to the body shape information field 4111 of the body shape posture range correspondence information table 411, which is stored in the correspondence information storage unit 41, selects (searches) the record, in which the height input to the first input unit 11 is registered, in the body shape information field 4111, and extracts the reclining range, the slide range, the lift range, and the tilt range, which are respectively registered in the reclining range information subfield 41121, the slide range information subfield 41122, the lift range information subfield 41123, and the tilt range information subfield 41124 of the posture range information field 4112 for this selected record.

Next, in the seat control system for setting a driving posture D, the posture control unit 32 tentatively sets the posture of the vehicle seat ST within each of the reclining range, the slide range, the lift range, and the tilt range extracted in processing S2 (S3). For example, the posture control unit 32 tentatively sets the posture of the vehicle seat ST at a median value of each of the reclining range, the slide range, the lift range, and the tilt range. In this embodiment, the posture control unit 32 only tentatively sets the posture of the vehicle seat ST and thus does not move the posture of the vehicle seat ST by the seat drive unit 5. However, the posture control unit 32 may move the posture of the vehicle seat ST by the seat drive unit 5 so as to achieve the tentatively-set posture of the vehicle seat ST.

Next, in the seat control system for setting a driving posture D, the measurement unit 2 measures the eye height of the occupant (S4).

Next, in the seat control system for setting a driving posture D, the posture control unit 32 sets the posture of the vehicle seat ST from the tentatively-set posture of the vehicle seat ST to the specific posture of the vehicle seat ST (S5). More specifically, the posture control unit 32 corrects the posture of the vehicle seat ST, which is tentatively set in processing S3, within each of the reclining range, the slide range, the lift range, and the tilt range extracted in processing S2 (within the posture range of the vehicle seat ST indicated by the posture range information extracted in processing S2) on the basis of the eye height measured by the measurement unit 2. In this way, the posture control unit 32 determines the specific posture of the vehicle seat ST within the posture range of the vehicle seat ST indicated by the posture range information extracted in processing S2 (S5).

For example, first, the seated height and the leg length (a tentative leg length) in the case where it is assumed that the occupant's body shape is the standard body shape is calculated from the ratio in the case of the height and the standard body shape input to the first input unit 11. Next, the seated height of the occupant is calculated from the eye height, which is measured by the measurement unit 2, and the actual leg length (the actual leg length) of the occupant is calculated from thus-calculated seated height and the height input to the first input unit 11. Then, in the case where the actual leg length is shorter than the tentative leg length, within each of the reclining range, the slide range, the lift range, and the tilt range extracted in processing S2 (within the posture range of the vehicle seat ST indicated by the posture range information extracted in processing S2), the tentatively-set posture of the vehicle seat ST is corrected to a posture in a direction toward a lower height, for example, to a posture shifted by a first specified value. In the case where the actual leg length is longer than the tentative leg length, within each of the ranges, the tentatively-set posture of the vehicle seat ST is corrected to a posture in a direction toward a higher height, for example, to a posture shifted by a second specified value. Of the posture range of the vehicle seat ST that is indicated by the posture range information extracted in processing S2, the posture in the direction toward the lower height is the posture within the posture range of the vehicle seat ST that overlaps the posture range of the vehicle seat ST indicated by the posture range information corresponding to the lower height than the height input to the first input unit 11. Of the posture range of the vehicle seat ST that is indicated by the posture range information extracted in processing S2, the posture in the direction toward the higher height is the posture within the posture range of the vehicle seat ST that overlaps the posture range of the vehicle seat ST indicated by the posture range information corresponding to the higher height than the height input to the first input unit 11. The first and second specified values may be the same value or different values, and may be set according to a difference between the actual leg length and the tentative leg length.

Next, in the seat control system for setting a driving posture D, the posture control unit 32 controls the seat drive unit 5 such that the posture of the vehicle seat ST becomes the specific posture of the vehicle seat ST set in processing S5 (S6). In this way, the vehicle seat ST becomes such a posture of the vehicle seat ST that achieves the appropriate driving posture for the seated occupant.

Next, in the seat control system for setting a driving posture D, the control processing unit 3 processes the manual adjustment of the posture of the vehicle seat ST (S7), and this processing is terminated. In this processing S7, the posture of the vehicle seat ST is adjusted within the posture range of the vehicle seat ST that is indicated by the posture range information extracted in processing S2. In other words, the tilt of the seat back SB by the operation of the SB switch 121 is limited within the reclining range extracted in processing S2, the front-rear position of the seat cushion SC by the operation of the SC switch 122 is limited within the slide range extracted in processing S2, the up-down position of the seat cushion SC by the operation of the SC switch 122 is limited within the lift range extracted in processing S2, and the tilt of the seat surface of the seat cushion SC by the operation of the SC switch 122 is limited within the tilt range extracted in processing S2. More specifically, for example, the control processing unit 3 determines presence or absence of the operation of the second input unit 12 within a specified time, which is set in advance, after the execution of processing S6. As a result of this determination, in the case where the operation of the second input unit 12 is absent within the specified time, processing S7 is terminated (that is, this processing is terminated). As the result of the determination, in the case where the operation of the second input unit 12 is present within the specified time, the posture control unit 32 of the control processing unit 3 controls the seat drive unit 5 according to the operation of the second input unit 12 under the limitation. After termination of this control, the control processing unit 3 determines the presence or the absence of the operation of the second input unit 12 within the specified time, and the execution of the processing follows in the same manner.

The occupant operates the third input unit 13 when necessary. For example, after operating the first selection switch 132-1, the occupant operates the SET switch 131. When the first selection switch 132-1 is operated, the storing processing unit 33 accepts the first storage area of the individual posture information storage unit 42 as the storage area for storing the posture of the vehicle seat ST. Then, when the SET switch 131 is operated, the storing processing unit 33 stores the seat posture information on the current posture of the vehicle seat ST in the first storage area of the individual posture information storage unit 42. In this way, such a posture of the vehicle seat ST that achieves the driving posture suited for the occupant is stored in the individual posture information storage unit 42. Such a posture of the vehicle seat ST that achieves the driving posture suited for the occupant can be replicated when the occupant gets in the vehicle.

As it has been described so far, the seat control system for setting a driving posture D in this embodiment and the seat control method for setting a driving posture implemented therein store the body shape posture range correspondence information in advance, extract the posture range information that corresponds to the body shape information input to the first input unit 11 from this the body shape posture range correspondence information, and control the seat drive unit 5 for moving the posture of the vehicle seat ST such that the posture of the vehicle seat ST falls within the posture range of the vehicle seat indicated by the extracted posture range information. Therefore, it is possible to automatically achieve the appropriate driving posture according to the occupant's body shape.

The seated height and the leg length differ by individual, and the driving posture depends on the seated height and the leg length. The seat control system for setting a driving posture D and the seat control method for setting a driving posture measure the eye height, and determine the specific posture of the vehicle seat ST within the posture range of the vehicle seat ST on the basis of this measured eye height. Therefore, it is possible to achieve the driving posture that corresponds to the seated height and the leg length of the occupant who is seated on the vehicle seat ST.

According to this embodiment, it is possible to provide the seat control system for setting a driving posture D and the seat control method for setting a driving posture that define the posture range of the vehicle seat ST by the position range R1 of the hip point HI.

In the case where the instruction to manually adjust the posture of the vehicle seat ST is input to the second input unit 12, the seat control system for setting a driving posture D and the seat control method for setting a driving posture control the seat drive unit 5 such that the posture of the vehicle seat ST becomes the posture of the vehicle seat ST corresponding to the instruction within the posture range of the vehicle seat ST indicated by the extracted posture range information. Therefore, even in the case where the posture of the vehicle seat ST is manually adjusted by the occupant after the automatic adjustment of the posture of the vehicle seat ST to the appropriate driving posture, it is possible to maintain the posture of the vehicle seat ST in the appropriate driving posture.

The present specification discloses the techniques in the various aspects as described above, and the main techniques thereof will be summarized below.

The seat control system for setting a driving posture according to one aspect of the disclosure includes the vehicle seat used in the vehicle; the correspondence information storage unit that stores the body shape posture range correspondence information in which the body shape information indicating the body shape and the posture range information indicating the posture range of the vehicle seat corresponding to the driving posture range correspond to each other; the seat drive unit that moves the posture of the vehicle seat; the input unit that inputs the body shape information; and the posture control unit that extracts the posture range information, which corresponds to the body shape information input to the input unit, from the body shape posture range correspondence information stored in the correspondence information storage unit, and controls the seat drive unit such that the posture of the vehicle seat falls within the posture range of the vehicle seat indicated by the extracted posture range information. Preferably, in the seat control system for setting a driving posture, the vehicle seat includes: the seat cushion on which the occupant is seated; the seat back on which the occupant leans; the reclining mechanism that adjusts the tilt of the seat back; the slide mechanism that adjusts the position of the seat cushion in the front-rear direction; the lift mechanism that adjusts the position (the height) of the seat cushion in the up-down direction; and the tilt mechanism that adjusts the tilt of the seat surface of the seat cushion, and the seat drive unit moves at least one of the reclining mechanism, the slide mechanism, the lift mechanism, and the tilt mechanism in order to move the posture of the vehicle seat.

Such a seat control system for setting a driving posture stores the body shape posture range correspondence information in advance, extracts the posture range information that corresponds to the body shape information input to the input unit from this body shape posture range correspondence information, and controls the seat drive unit for moving the posture of the vehicle seat such that the posture of the vehicle seat falls within the posture range of the vehicle seat indicated by the extracted posture range information. Therefore, it is possible to automatically achieve the appropriate driving posture according to the occupant's body shape.

In another aspect of the disclosure, the above-described seat control system for setting a driving posture further includes the measurement unit that measures the eye height of the occupant who is seated on the vehicle seat, and the posture control unit determines the specific posture of the vehicle seat within the posture range of the vehicle seat on the basis of the eye height measured by the measurement unit and controls the seat drive unit such that the posture of the vehicle seat becomes the determined posture of the vehicle seat.

The seated height and the leg length differ by individual, and the driving posture depends on the seated height and the leg length. Such a seat control system for setting a driving posture measures the eye height, and determines the specific posture of the vehicle seat within the posture range of the vehicle seat on the basis of this measured eye height. Therefore, it is possible to achieve the driving posture that corresponds to the seated height and the leg length of the occupant who is seated on the vehicle seat.

In another aspect of the disclosure, in these seat control systems for setting a driving posture described above, the posture range of the vehicle seat is the position range of the hip point, and the position range of the hip point is set on the basis of the ankle angle and the knee angle of the occupant who is seated on the vehicle seat.

With such a configuration, it is possible to provide the seat control system for setting a driving posture that defines the posture range of the vehicle seat by the position range of the hip point.

In another aspect of the disclosure, each of these seat control systems for setting a driving posture described above further includes the second input unit that inputs the instruction to move the posture of the vehicle seat, and the posture control unit controls the seat drive unit such that the posture of the vehicle seat becomes the posture of the vehicle seat corresponding to the instruction within the posture range of the vehicle seat indicated by the extracted posture range information in the case where the instruction is input to the second input unit.

Such a seat control system for setting a driving posture controls the seat drive unit such that the posture of the vehicle seat becomes the posture of the vehicle seat corresponding to the instruction within the posture range of the vehicle seat indicated by the extracted posture range information in the case where the instruction is input to the second input unit. Therefore, even in the case where the posture of the vehicle seat is manually adjusted by the occupant after the automatic adjustment of the posture of the vehicle seat to the appropriate driving posture, it is possible to maintain the posture of the vehicle seat in the appropriate driving posture.

The seat control method for setting a driving posture according to another aspect of the disclosure includes the input step of inputting the body shape information that indicates the body shape; the extraction step of extracting the posture range information, which corresponds to the body shape information input in the input step, from the body shape posture range correspondence information in which the body shape information and the posture range information indicating the posture range of the vehicle seat corresponding to the driving posture range correspond to each other; and the posture control step of controlling the posture of the vehicle seat such that the posture of the vehicle seat falls within the posture range of the vehicle seat indicated by the extracted posture range information in the extraction step.

In the disclosed seat control method for setting a driving posture, the posture range information, which corresponds to the body shape information input in the input step, is extracted from the body shape posture range correspondence information, and the posture of the vehicle seat is controlled such that the posture of the vehicle seat falls within the posture range of the vehicle seat indicated by the extracted posture range information. Therefore, it is possible to automatically achieve the appropriate driving posture according to the occupant's body shape.

The present application is based on Japanese Patent Application No. 2020-66117 filed on Apr. 1, 2020, the contents of which are included in the present application.

In order to express the present disclosure, the appropriate and sufficient description has been made above through the embodiment with reference to the drawings. However, it should be recognized that a person skilled in the art could easily modify and/or improve the above-described embodiment. Therefore, as long as a modified embodiment or an improved embodiment implemented by the person skilled in the art is not in a level that departs from the scope of the claims described in the claims, the modified embodiment or the improved embodiment is construed to be encompassed within the scope of the claims.

According to the present disclosure, a seat control system for setting a driving posture and a seat control method for setting a driving posture that control the posture of the vehicle seat are provided.

What is claimed is:

1. A seat control system for setting a driving posture comprising:
  a vehicle seat used in a vehicle;
  a correspondence information memory that stores body shape posture range correspondence information in which body shape information, including a height of an occupant, indicating a body shape and posture range information indicating a posture range of the vehicle seat corresponding to a driving posture range correspond to each other;
  a seat driver mechanism that moves a posture of the vehicle seat;
  an input switch that inputs the body shape information;
  an eye height measurer that measures an eye height of the occupant when the occupant is seated on the vehicle seat; and a posture control processor for performing the steps of:
extracting the posture range information which corresponds to the body shape information input by the input switch from the body shape posture range correspondence information stored in the correspondence information memory,
determining a tentative posture of the vehicle seat within the posture range of the vehicle seat indicated by the extracted posture range information,
controlling the seat driver mechanism such that the posture of the vehicle seat becomes the tentative posture,
determining a specific posture of the vehicle seat by correcting the tentative posture based on the body shape information input by the input switch and the eye height measured by the eye height measurer, and
controlling the seat driver mechanism such that the posture of the vehicle seat becomes the specific posture;
wherein the eye height measurer is configured to measure the eye height of the occupant after the posture of the vehicle seat becomes the tentative posture and before the posture control processor determines the specific posture of the vehicle seat.

2. The seat control system for setting a driving posture according to claim 1,
wherein the posture range of the vehicle seat is a position range of a hip point, and
the position range of the hip point is set on the basis of an ankle angle and a knee angle of the occupant who is seated on the vehicle seat.

3. The seat control system for setting a driving posture according to claim 1 further comprising:
a second input switch that inputs an instruction to move the posture of the vehicle seat,
wherein, in the case where the instruction is input to the second input switch, the posture control processor controls the seat driver mechanism such that the posture of the vehicle seat becomes the posture of the vehicle seat corresponding to the instruction within the posture range of the vehicle seat indicated by the extracted posture range information.

4. A seat control method for setting a driving posture comprising:
an input step of inputting body shape information, including a height of an occupant, that indicates a body shape;
an extraction step of extracting posture range information, which corresponds to the body shape information input in the input step, from body shape posture range correspondence information in which the body shape information and posture range information indicating a posture range of a vehicle seat corresponding to a driving posture range correspond to each other;
a measuring step of measuring an eye height of the occupant when the occupant is seated on the vehicle seat; and
a posture control step of controlling a posture of the vehicle seat such that the posture of the vehicle seat falls within the posture range of the vehicle seat indicated by the extracted posture range information in the extraction step and the eye height measured in the measuring step;

wherein the posture control step comprises:
determining a tentative posture of the vehicle seat within the posture range of the vehicle seat indicated by the extracted posture range information,
controlling the posture of the vehicle seat such that the posture of the vehicle seat becomes the tentative posture,
determining a specific posture of the vehicle seat by correcting the tentative posture based on the body shape information input in the input step and the eye height measured in the measuring step, and
controlling the posture of the vehicle seat such that the posture of the vehicle seat becomes the specific posture; and
wherein the eye height of the occupant is measured after the posture of the vehicle seat becomes the tentative posture and before the specific posture of the vehicle seat is determined.

5. The seat control system for setting a driving posture according to claim 1,
wherein the posture range of the vehicle seat is a position range of a hip point, and
the position range of the hip point is set on the basis of an ankle angle and a knee angle of the occupant who is seated on the vehicle seat.

6. The seat control system for setting a driving posture according to claim 1 further comprising:
a second input switch that inputs an instruction to move the posture of the vehicle seat,
wherein, in the case where the instruction is input to the second input switch, the posture control processor controls the seat driver mechanism such that the posture of the vehicle seat becomes the posture of the vehicle seat corresponding to the instruction within the posture range of the vehicle seat indicated by the extracted posture range information.

7. The seat control system for setting a driving posture according to claim 2, further comprising:
a second input switch that inputs an instruction to move the posture of the vehicle seat,
wherein, in the case where the instruction is input to the second input switch, the posture control processor controls the seat driver mechanism such that the posture of the vehicle seat becomes the posture of the vehicle seat corresponding to the instruction within the posture range of the vehicle seat indicated by the extracted posture range information.

8. The seat control system for setting a driving posture according to claim 5, further comprising:
a second input switch that inputs an instruction to move the posture of the vehicle seat,
wherein, in the case where the instruction is input to the second input switch, the posture control processor controls the seat driver mechanism such that the posture of the vehicle seat becomes the posture of the vehicle seat corresponding to the instruction within the posture range of the vehicle seat indicated by the extracted posture range information.

* * * * *